Figure 1:
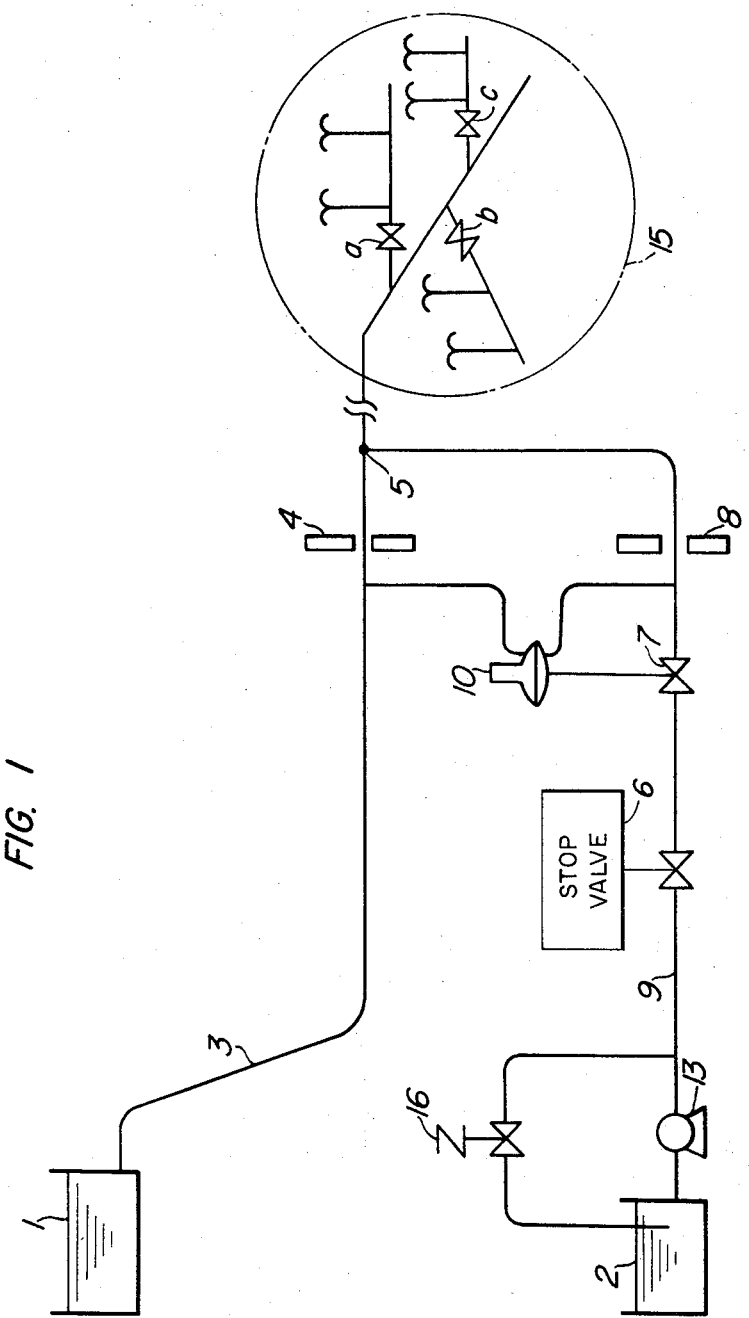

United States Patent
Mihara

[11] 3,770,198
[45] Nov. 6, 1973

[54] METHOD AND APPARATUS FOR DILUTING AND MIXING CHEMICAL SOLUTION FOR AGRICULTURE

[75] Inventor: Kazuyasu Mihara, Niihama, Japan

[73] Assignee: Sumitomo Chemical Company, Ltd., Osaka, Tokico, Ltd., Kanagawa-ken, both of Japan

[22] Filed: Mar. 24, 1972

[21] Appl. No.: 237,802

[30] Foreign Application Priority Data
Mar. 29, 1971 Japan.............................. 46/22806

[52] U.S. Cl..................... 239/10, 137/100, 239/61, 239/310, 239/407
[51] Int. Cl. ........................................... G05d 7/00
[58] Field of Search........................ 239/10, 61, 412, 239/310, 407; 137/100

[56] References Cited
UNITED STATES PATENTS

| | | | |
|---|---|---|---|
| 3,047,003 | 7/1962 | Gurney | 137/100 |
| 2,823,740 | 2/1958 | Morck, Jr. | 239/61 |
| 2,265,961 | 12/1941 | Ziebolz | 137/100 |
| 2,657,091 | 10/1953 | Quarles | 239/61 |
| 3,464,626 | 9/1969 | Stamps et al. | 239/10 |
| 3,519,010 | 7/1970 | Helling et al. | 137/100 |
| 3,685,531 | 8/1972 | Byford | 137/100 X |

*Primary Examiner*—Lloyd L. King
*Assistant Examiner*—A. Kashnikow
*Attorney*—Richard K. Stevens et al.

[57] ABSTRACT

A chemical solution such as farm chemicals, pesticides or liquid fertilizers is injected and mixed under pressure at a predetermined rate into pressurized water and automatically controlled when spraying of the diluted and mixed chemical solution is discontinued or restarted, by means of an apparatus comprising a pressurized water conduit provided with an orifice and a connecting part successively in a water flow passage, a forward end of the water conduit being connected to a spraying means, a pressurized chemical solution conduit provided with a stop valve, a pressure regulator valve and an orifice successively in a solution conduit, a forward end of the solution conduit being connected with the connecting part of the pressurized water conduit, a pressure regulator mechanism capable of detecting pressures at upstream sides of the orifices of the pressurized water conduit and the pressurized chemical solution conduit, respectively, and equilibrating the pressures through a pressure regulator valve synchronized with a controlling device, and a mechanism capable of detecting flow rates through pressure differences between the upstream and downstream of the respective orifices of the pressurized water conduit and the pressurized chemical solution conduit by means of a flow rate checking means, and synchronizing the pressure differences with opening or closing of the stop valve through a valve-operating monitor.

8 Claims, 5 Drawing Figures

FIG. I

METHOD AND APPARATUS FOR DILUTING AND MIXING CHEMICAL SOLUTION FOR AGRICULTURE

This invention relates to a method and an apparatus for diluting and mixing a chemical solution such as farm chemicals, pesticides, liquid fertilizer, etc. with water to a predetermined proportion.

A large-scale orchard or farm has been recently using a method for spraying an agricultural chemical solution such as farm chemicals, pesticides, liquid fertilizers, etc. by means of a sprinkler, while mixing and diluting the chemical solution with water to a predetermined proportion. One of main devices of the so-called agricultural sprinkler system is an apparatus for diluting and mixing the chemical solution with water. The dilution and mixing of such a chemical solution are carried out by injecting and mixing into a pressurized water conduit generally under a wide range of the atmospheric pressure to 15 kg/cm$^2$.g the chemical solution at a predetermined rate in proportion to a flow rate of water passing through the conduit.

The present invention provides a method and an apparatus developed from these viewpoints and particularly devised as a method and an apparatus for diluting and mixing a chemical solution for agriculture with water.

For the dilution and mixing of a chemical solution such as farm chemicals, pesticides, liquid fertilizers, etc. for agriculture, it is strongly desired particularly that the desired concentration of the chemical can be securely maintained within a narrow definite range, the operation of the apparatus is simple and closely connected to labor saving, and the operation can be automatically kept to a safety and desired conditions, even if there is some misoperation.

Now, the present invention will be explained in detail, referring to the accompanying drawings.

FIGS. 1 to 5 are schematic flow diagrams showing embodiments of the present invention.

In FIG. 1, water flows down under pressure from a head tank 1 installed at a definite high level, for example, on a top of hill through a conduit 3, and is led to a liquid-spraying means 15, for example, a sprinkler or sprayer through an orifice 4 and a connecting part 5. At that time, the water head tank 1 is not always necessary to install at such a high level. That is, water can be effectively transferred under pressure by means of a suitable pump from a water tank installed even at a low level. On the other hand, an agricultural chemical solution such as farm chemicals, pesticides, liquid fertilizers, etc. is transferred from a chemical solution feed tank 2 through a conduit 9 under pressure by a pump 13 and led to the connecting part 5 of the pressurized water conduit 3 through a stop valve 6, for example, electromagnetic valve, pneumatically operated valve, etc., a pressure regulator valve 7 and an orifice 8, and the pressurized chemical solution is injected into the pressurized water through the connecting part 5. A pressure control valve 16 provided at a discharge side of the pump 13 is effectively utilized to control a discharge pressure of the pump 13 and stirs the feed chemical solution in the feed tank 2 at the same time. As the feed chemical solution, a liquid fertilizer and water-soluble pesticides and farm chemicals are used in a liquid state. Orifices 4 and 8 are provided in the conduits 3 and 9, respectively, and the controller 10 of a pressure regulator valve 7 is used to receive a pressure signal from the upstream sides of the orifices 4 and 8, and adjust and keep the pressure of the chemical solution in the conduit 9 to the same level of the pressure of the water in the conduit. The controller 10 provides a diaphragm, where the regulation of pressure is carried out by converting displacements of the diaphragm to the degree of opening of valve plug of the pressure regulator valve 7 synchronized with the displacements. That is to say, when the pressure of the chemical solution turns higher than the pressure of the water, the diaphragm of the controller is displaced towards the water side, and therefore the degree of opening of the valve plug of the pressure regulator valve 7 synchronized with the displacement is reduced thereby. The flow rate of the chemical solution passing through the valves is throttled, and the pressure of the downstream side of the pressure regulator valve 7 is lowered. When the pressure of the downstream side of the pressure regulator valve 7 for the chemical solution turns lower than the pressure of the water in the conduit 3, the valve functions in a reversed manner, whereby the pressure regulation can be carried out. This pressure regulation continuously functions in a repeated manner until the pressure of the water in the conduit 3 at the upstream side of the orifice 4 becomes identical with the pressure of the downstream side of the pressure regulator valve 7 in the feed chemical solution conduit 9.

Figure 2:
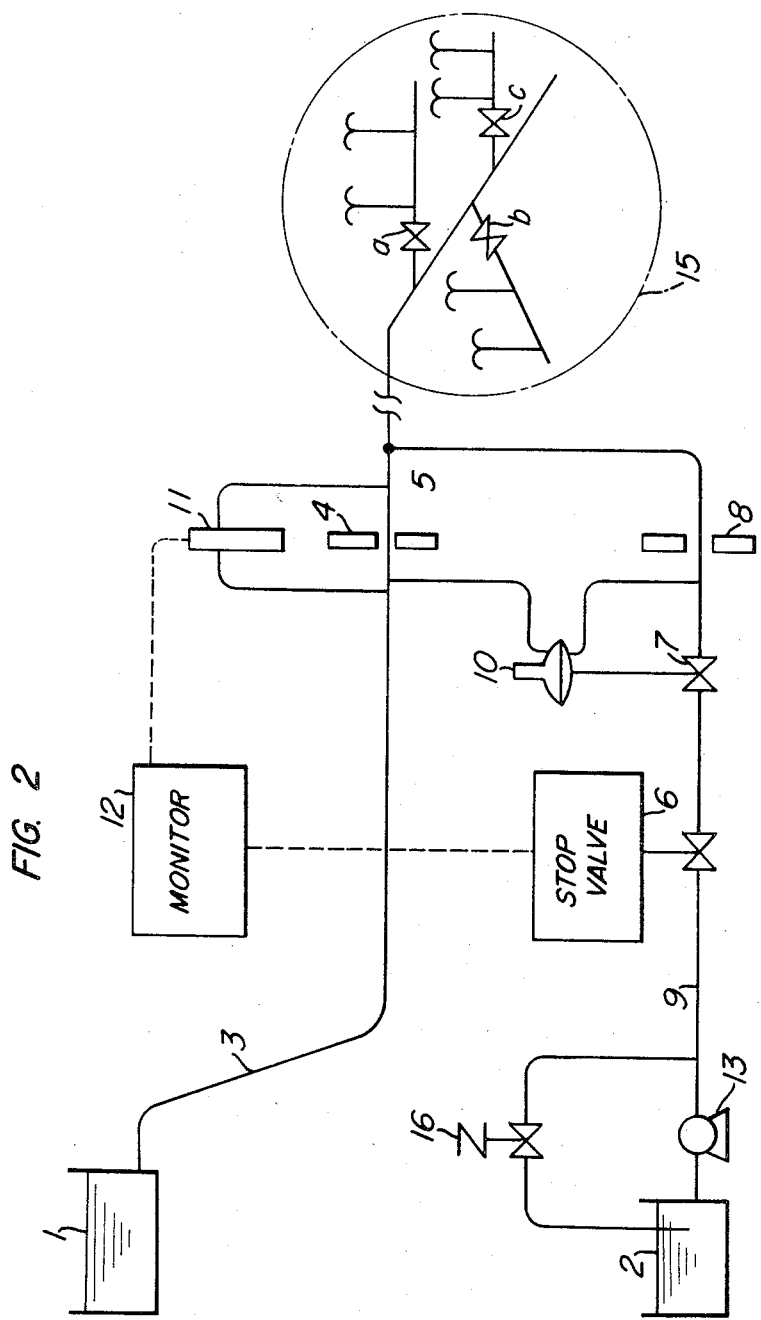

In FIG. 2, another embodiment is shown, where a function to open or close the pressurized chemical solution conduit 9 when the liquid-spraying means 15 is used or not is added to the apparatus shown in FIG. 1. That is, as shown in FIG. 2, a flow rate-detecting means 11 is provided in the pressurized water conduit 3 to detect a pressure difference between the upstream side and the downstream side of the orifice 4, that is, the flow rate, and transfer the detected flow rate to a valve-operating monitor 12. A stop valve 6 is provided at the upstream side of the pressure regulator valve 7 in the pressurized chemical solution conduit 9. As the stop valve 6, an electromagnetic valve, pneumatically operated valve, etc. can be used. The valve-operating monitor 12 is connected to said stop valve 6, and transmits an actuating signal to the stop valve 6 according to a flow rate signal from the flow rate-detecting means 11. When the signal from the flow rate-detecting means 11 shows zero, the valve-operating monitor 12 transmits a signal to close the valve to the stop valve 6, whereby the conduit 9 is closed.

That is, when operating valves 15a–15c are closed at the liquid-spraying means 15 and the liquid spraying is discontinued, the flow rate detecting means 11 detects a zero flow rate and transmits a zero signal to the monitor 12. The monitor 12 immediately transmits a valve closure signal to the stop valve 6, and the pressurized chemical solution conduit 9 is automatically closed, whereby a mixing of the chemical solution into the pressurized water conduit 3 can be prevented.

Further, when the operating valves 15a–15c are reopened and the liquid spraying is started again, the flow rate-detecting means 11 immediately transmits a flow rate signal to the monitor 12, and the stop valve 6 is automatically opened, whereby the mixing of the chemical solution with water is started.

Figure 3:
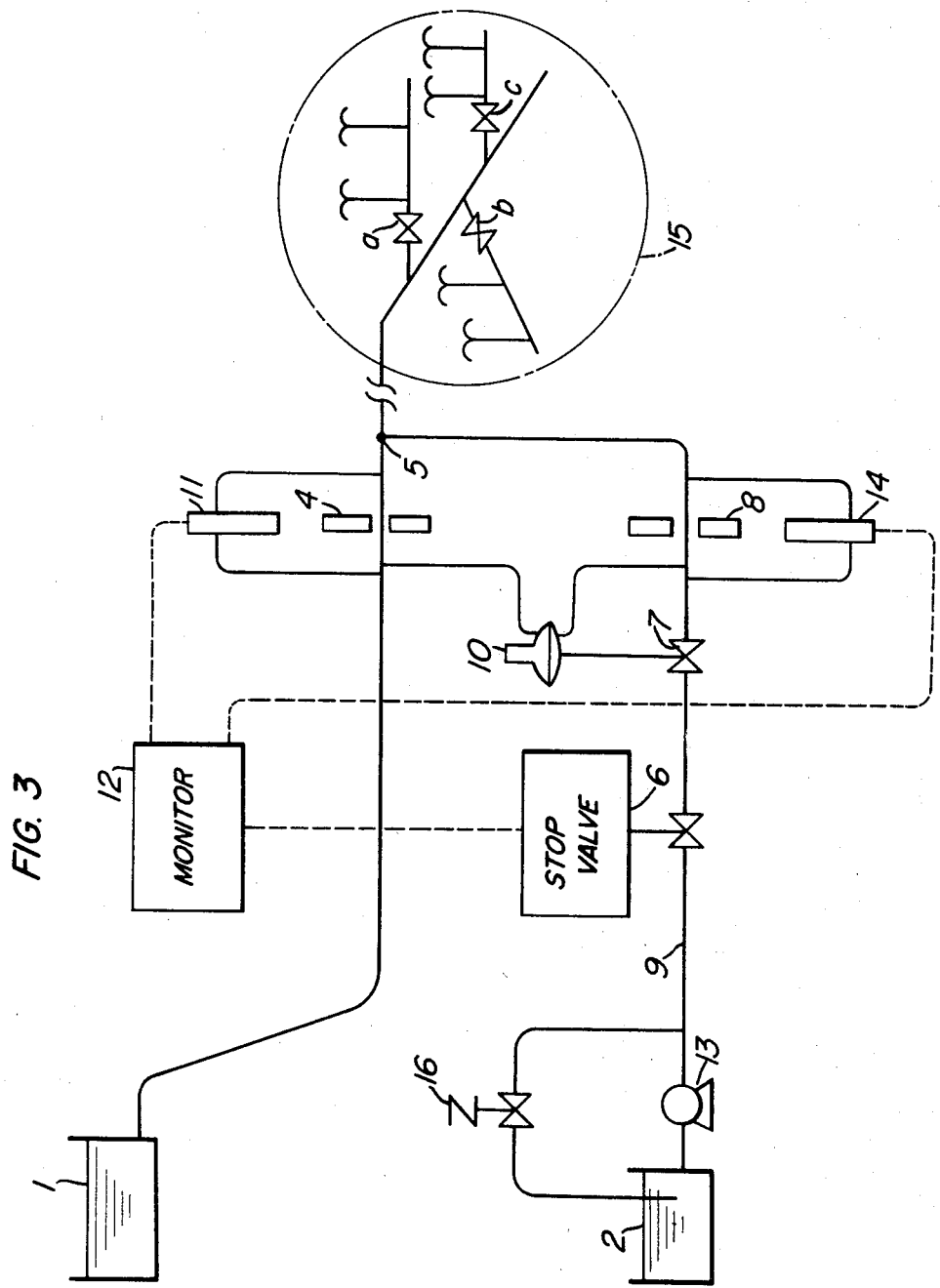

In FIG. 3, another embodiment is shown, where a function to close the pressurized chemical solution conduit 9 for an emergency when there occurs a disorder in the pressure regulator valve 7 is added to the apparatus as shown in FIG. 2. As shown in FIG. 3, a flow rate-detecting means 14 is provided in the pressurized chemical solution conduit 9 to detect a pressure difference between the upstream side and the downstream side of the orifice 8, that is, a flow rate, and transfer the detected flow rate to the valve-operating monitor 12.

The monitor 12 receives a flow rate signal from the flow rate-detecting means 14, and when the valve of the flow rate signal exceeds the predetermined one or the mixing ratio exceeds a predetermined proportion based on the flow rate of water detected by the flow rate-detecting means 11, the monitor 12 transmits a valve closure signal to the stop valve 6 to close the pressurized chemical solution conduit 9.

That is, when the chemical solution flows in excess of the predetermined flow rate owing to a disorder of the pressure regulator valve 7, etc. or a mixing ratio exceeds the predetermined proportion, the stop valve is automatically closed immediately, and an inconvenience due to the further mixing of the chemical solution can be prevented thereby.

Figure 4:
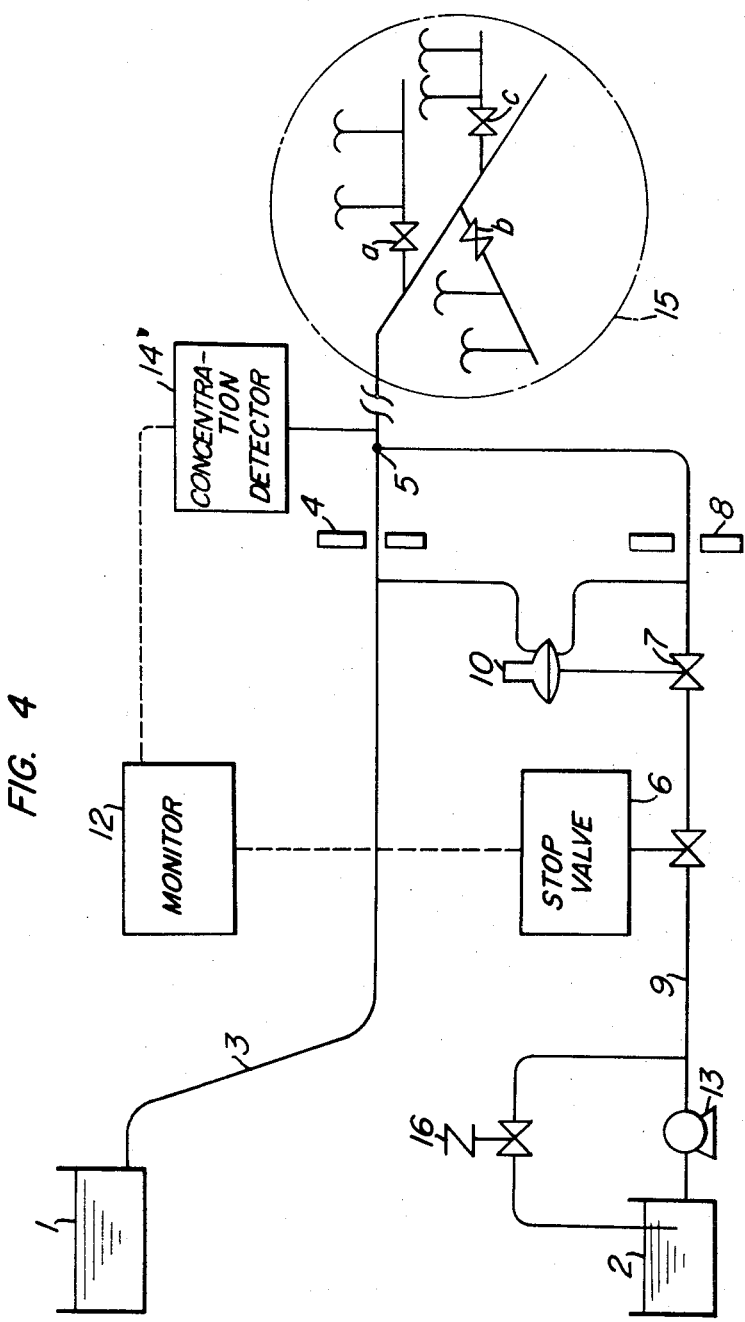

In FIG. 4, another embodiment is shown where a function to close the pressurized chemical solution conduit for an emergency by other means than that of the embodiment of FIG. 3 is added to the embodiment of FIG. 1. That is, as shown in FIG. 4, a concentration detecting means 14' which transfers a signal to the monitor 12 is provided at any desired position from the downstream side of the connecting part 5 at the joint of two conduits 3 and 9 up to the liquid-spraying means 15. The signal from said means 14' is transferred to the valve-operating monitor 12, and when the concentration of the mixed solution exceeds a predetermined value, the monitor 12 transmits a valve closure signal to the stop valve 6 according to the signal from the concentration-detecting means 14'. According to this system, such a complicated operation as the comparison with the flow rate of other conduit by the monitor 12 as shown in FIG. 3, is not necessary.

Figure 5:
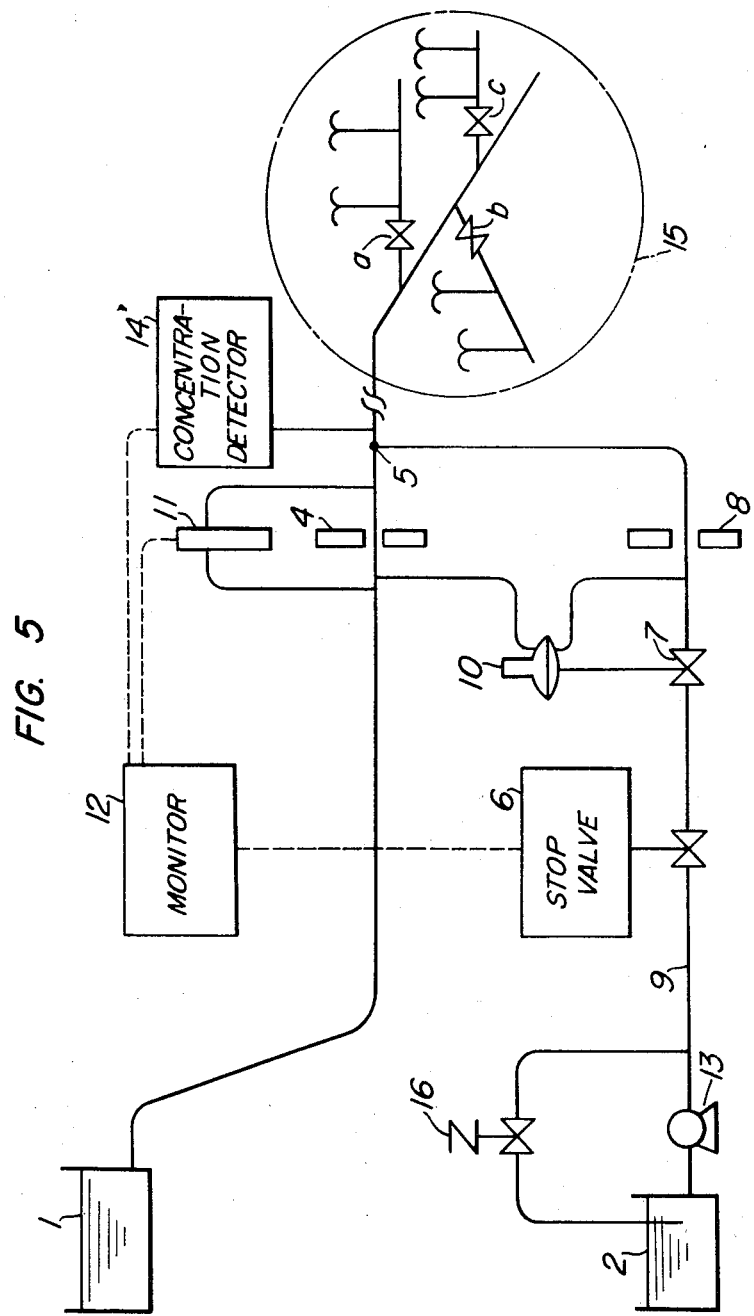

In FIG. 5, another embodiment is shown, where a function to close the conduit 9 for an emergency, as shown in FIG. 4, is added to the embodiment of FIG. 2. That is, the chemical solution conduit 9 is automatically opened or closed by a combination of the flow rate-detecting means 11 and the monitor 12 according to the use of the liquid-spraying means, and an abnormal mixing of the chemical solution due to a disorder of the pressure regulator valve, 7, etc. can be prevented. The mechanism is simpler than that of FIG. 3, and has a function to close or open the chemical solution conduit 9 according to the state of liquid spraying and close the conduit 9 for an emergency.

As described above, in the present apparatus, a chemical solution adjusted to a pressure equal to that of the pressurized water can be injected and mixed under pressure, at a predetermined rate, into the pressurized water passing through a conduit, and at the same time discontinuation and feeding of the chemical solution can be automatically controlled when spraying of the agricultural solution diluted and mixed with the chemical solution is discontinued or restarted. Therefore, the dilution of a chemical solution by water can be always maintained in a constant range and the chemical can be always treated with the safety. Therefore, the present apparatus is most suitable for dilution and spraying of farm chemicals, pesticides, liquid fertilizer, etc. for agriculture.

What is claimed is:

1. An apparatus for diluting and mixing a chemical solution for agriculture with water to a predetermined mixing proportion, which comprises a water conduit provided with an orifice and a connecting part successively in a water flow passage, a chemical solution conduit provided with a pressure regulator valve and an orifice successively in a chemical solution flow passage and connected to the connecting part of the water conduit, a liquid-spraying means connected to a forward end of the connecting part of the water conduit, a controller to regulate a degree of opening of the pressure regulator valve in correspondence with a pressure at an upstream side of the orifices, a stop valve at an upstream side of said pressure regulator valve in the chemical solution conduit, a flow rate-detecting means in said water conduit to detect a pressure difference between the upstream side and the downstream side of the orifice, and a valve-operating monitor to receive a signal from the flow rate-detecting means to operate the stop valve, whereby the stop valve is automatically closed or opened in correspondence with the use of the liquid-spraying means.

2. An apparatus according to claim 1, wherein a flow rate-detecting means is provided in the chemical solution conduit to detect a pressure difference between an upstream side and a downstream side of the orifice and transfer a flow rate signal to the valve-operating monitor, and the stop valve is automatically closed when the chemical solution flows through the conduit at a mixing ratio in excess of a predetermined one, based on a flow rate of water.

3. A method for diluting and mixing a chemical solution for agriculture with water to a predetermined mixing proportion, which comprises passing water through a water conduit provided with an orifice having a flow rate-detecting means to detect a pressure difference between the upstream side and the downstream side of the orifice, and a connecting part successively in a water flow passage to a liquid-spraying means connected to a forward end of the connecting part of the water conduit, while passing a chemical solution through a chemical solution conduit provided with a pressure regulator valve having a stop valve provided at an upstream side of the pressure regulator valve and an orifice successively in a chemical solution flow passage and connected to the connecting part of the water conduit, and mixing the water with the chemical solution at the connecting part under control of a controller to regulate the degree of opening of the pressure regulator valve in correspondence with a pressure at an upstream side of the orifices while having a valve-operating monitor receiving a signal from the flow rate-detecting means so as to operate the stop valve, whereby the stop valve is automatically closed or opened in correspondence with the use of the liquid-spraying means.

4. A method according to claim 3, wherein a flow rate-detecting means is provided in the chemical solution conduit to detect a pressure difference between an up-stream side and a downstream side of the orifice and transfer a flow rate signal to the valve-operating monitor, and the stop valve is automatically closed when the chemical solution flows through the conduit at a mixing ratio in excess of a predetermined one, based on a flow rate of water.

5. An apparatus for diluting and mixing a chemical solution for agriculture with water to a predetermined mixing proportion, which comprises a water conduit provided with an orifice and a connecting part successively in a water flow passage, a chemical solution conduit provided with a pressure regulator valve having a stop valve provided at an upstream side of the pressure regulator valve and an orifice successively in a chemical solution flow passage and connected to the connecting part of the water conduit, a liquid-spraying means connected to a forward end of the connecting part of the water conduit, a controller to regulate a degree of opening of the pressure regulator valve in correspondence with a pressure at an upstream side of the orifices, a valve-operating monitor which operates the stop valve and a liquid concentration-detecting means at a downstream side of the connecting part at a joint of the water conduit and the chemical solution conduit to transfer a concentration signal to said valve-operating monitor, whereby said stop valve is closed when the concentration of mixed solution exceeds a predetermined one.

6. An apparatus for diluting and mixing a chemical solution for agriculture with water to a predetermined mixing proportion, which comprises a water conduit provided with an orifice and a connecting part successively in a water flow passage, a chemical solution conduit provided with a pressure regulator valve and an orifice successively in a chemical solution flow passage and connected to the connecting part of the water conduit, a liquid-spraying means connected to a forward end of the connecting part of the water conduit, a controller to regulate a degree of opening of the pressure regulator valve in correspondence with a pressure at an upstream side of the orifices, a stop valve at an upstream side of said pressure regulator valve in the chemical solution conduit, a flow rate-detecting means in said water conduit to detect a pressure difference between the upstream side and the downstream side of the orifice, and a valve-operating monitor to receive a signal from the flow rate-detecting means to operate the stop valve, whereby the stop valve is automatically closed or opened in correspondence with the use of the liquid-spraying means, concentration-detecting means at a downstream side of the connecting part at a joint of the water conduit and the chemical solution conduit to transfer a concentration signal to the valve-operating monitor whereby the stop valve is closed when the concentration of mixed solution exceeds a predetermined one.

7. A method for diluting and mixing a chemical solution for agriculture with water to a predetermined mixing proportion, which comprises passing water through a water conduit provided with an orifice and a connecting part sucessively in a water flow passage to a liquid-spraying means connected to a forward end of the connecting part of the water conduit, while passing a chemical solution through a chemical solution conduit provided with a pressure regulator valve having a stop valve provided at an upsteam side of the pressure regulator valve and an orifice successively in a chemical solution flow passage and connected to the connecting part of the water conduit, and mixing the water with the chemical solution at the connecting part under control of a controller to regulate a degree of opening of the pressure regulator valve in correspondence with a pressure at an upstream side of the orifices with a liquid concentration-detecting means at a downstream side of the connecting part at a joint of the water conduit and the chemical solution conduit transferring a concentration signal to a valve-operating monitor which operates the stop valve whereby the stop valve is closed when the concentration of mixed solution exceeds a predetermined one.

8. A method for diluting and mixing a chemical solution for agriculture with water to a predetermined mixing proportion, which comprises passing water through a water conduit provided with an orifice having a flow rate-detecting means to detect a pressure difference between the upstream side and the downstream side of the orifice, and a connecting part successively in a water flow passage to a liquid-spraying means connected to a forward end of the connecting part of the water conduit, while passing a chemical solution through a chemical solution conduit provided with a pressure regulator valve having a stop valve provided at an upstream side of the pressure regulator valve and an orifice successively in a chemical solution flow passage and connected to the connecting part of the water conduit, and mixing the water with the chemical solution at the connecting part under control of a controller to regulate a degree of opening of the pressure regulator valve in correspondence with a pressure at an upstream side of the orifices while having a valve-operating monitor receiving a signal from the flow rate-detecting means so as to operate the stop valve, whereby the stop valve is automatically closed or opened in correspondence with the use of the liquid-spraying means and having a concentration-detecting means at a downstream side of the connecting part at a joint of the water conduit and the chemical solution conduit to transfer a concentration signal to the valve-operating monitor whereby the stop valve is closed when the concentration of mixed solution exceeds a predetermined one.

\* \* \* \* \*